H. N. JENSEN.
RADIATOR FOR AUTOMOBILES AND THE LIKE.
APPLICATION FILED APR. 12, 1920.
1,396,633.
Patented Nov. 8, 1921.
2 SHEETS—SHEET 1.
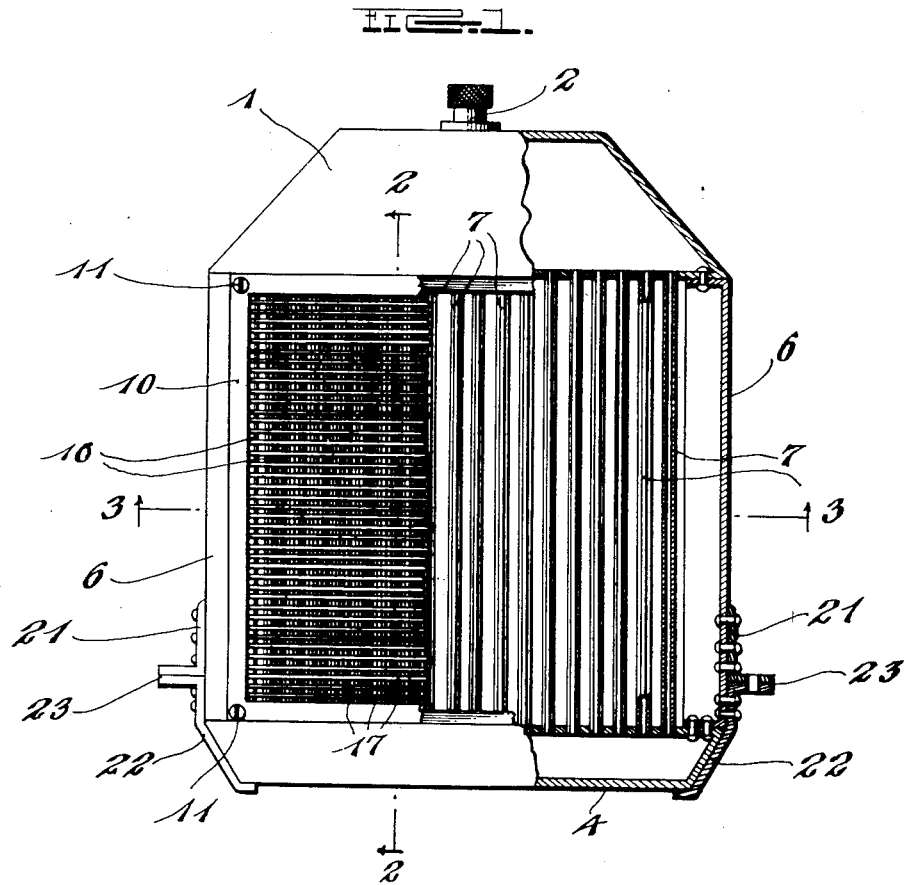
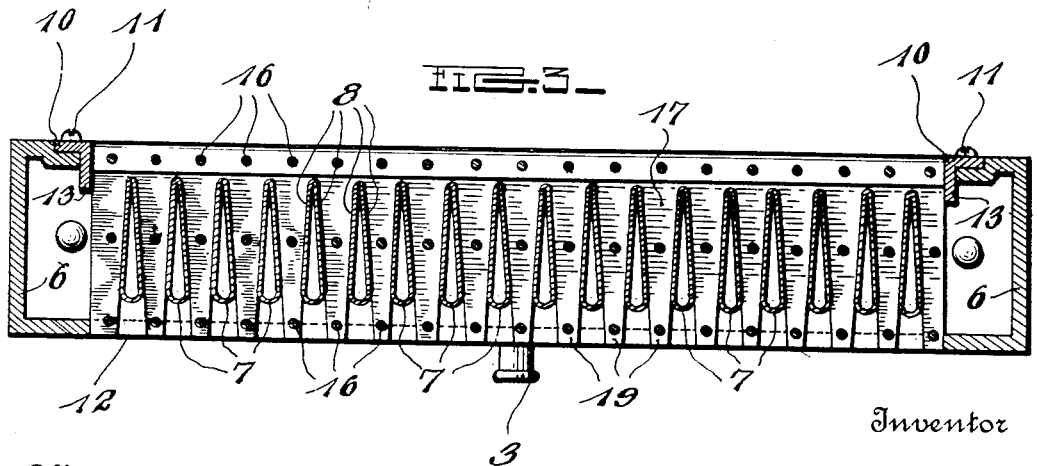
Witness
Inventor
H.N. Jensen

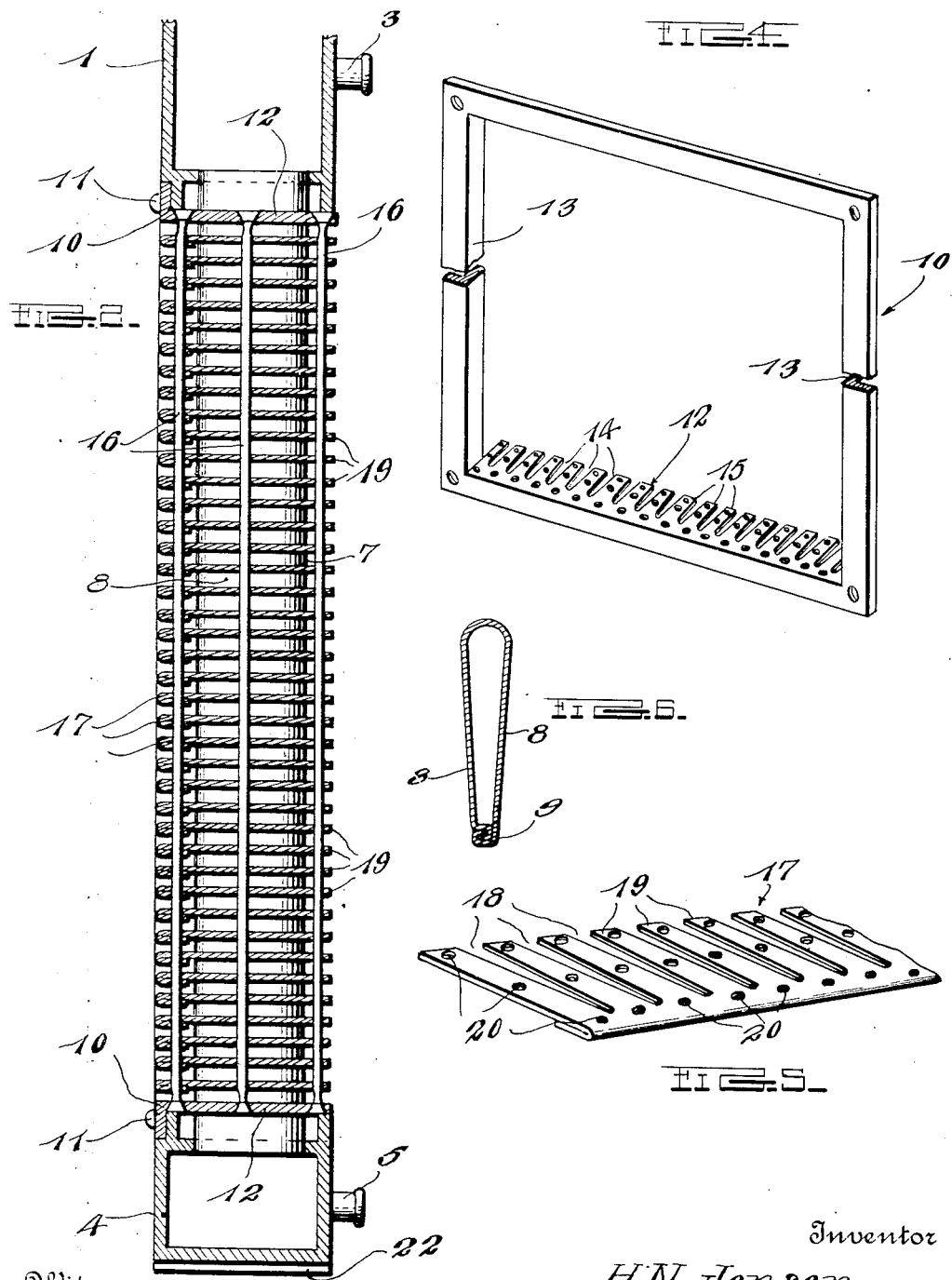

UNITED STATES PATENT OFFICE.

HENRY N. JENSEN, OF ESTHERVILLE, IOWA.

RADIATOR FOR AUTOMOBILES AND THE LIKE.

1,396,633.  Specification of Letters Patent.  Patented Nov. 8, 1921.

Application filed April 12, 1920. Serial No. 373,318.

*To all whom it may concern:*

Be it known that I, HENRY N. JENSEN, a citizen of the United States, residing at Estherville, in the county of Emmet and State of Iowa, have invented certain new and useful Improvements in Radiators for Automobiles and the like; and I do declare the following to be a full, clear, and exact description of the invention, such as will enable others skilled in the art to which it appertains to make and use the same.

This invention relates to radiators for automobiles or the like and is used for cooling the cooling fluid for the cylinders of the engines thereof.

One object of the invention is to provide a radiator of this type having upper and lower tanks connected by conduits which are constructed in shape so that during cold weather there is not much danger of the fluid passing therethrough freezing, and even if the fluid does freeze, the conduits are not liable to burst as the fluid expands during such freezing.

Another object of the invention is to provide a radiator of this type having upper and lower tanks connected by conduits which are constructed and shaped so as to present comparatively large radiating surfaces.

A further object of the invention is to provide a radiator of this type having upper and lower tanks connected by vertical conduits and a plurality of horizontal fin plates having portions disposed adjacent the sides of the conduits and therebetween in order to conduct the heat therefrom, said fin plates being removable as a single unit from the radiator so that in case any of the conduits burst or otherwise become defective, access to them may be easily obtained without the interference of the fin plates.

An additional object of the invenion is to provide a novel means for fastening a radiator to the frame of an automobile or the like and at the same time reinforcing the portions of the radiator adjacent the points of attachment to the frame of the automobile or the like.

A general object of the invention is to improve upon radiators of this class by the provision of an extremely simple, strong, durable and inexpensive construction, one which will be efficient and reliable in operation, and well adapted to the purpose for which it is designed.

With these and other objects in view, the invention consists of the novel features of construction, and the combination and arrangement of parts as are hereinafter fully described and claimed.

In the accompanying drawings in which similar reference characters designate like parts throughout the several views:—

Figure 1 is a front view, partly in section of a radiator constructed in accordance with this invention.

Fig. 2 is a vertical sectional view of a portion of the radiator taken on the plane indicated by the line 2—2 of Fig. 1.

Fig. 3 is a horizontal transverse sectional view taken on the plane indicated by the line 3—3 of Fig. 1.

Fig. 4 is a perspective view of a removable frame which carries the horizontal fin plates.

Fig. 5 is a similar view of a portion of one of the fin plates.

Fig. 6 is a transverse sectional view of a form of conduit which may be used in connection with the radiator.

In the embodiment illustrated the numeral 1 designates an upper tank provided at its top with a filling spout 2 suitably closed under normal conditions by a cap, and at its rear side with a nipple 3 to which a tube may be attached to carry the cooling fluid from the engine into the tank. The numeral 4 designates a lower tank which is provided at its rear side with a nipple 5 adapted to have a tube attached thereto which leads from the engine so as to carry the cooling fluid from the tank 4 thereto. The tanks 1 and 4 are connected together by means of vertical side plates 6 which have their ends turned inwardly and riveted to the bottom and top respectively thereof.

In radiators of this type it is usual to have the upper and lower tanks arranged in communication with each other by means of a great number of small conduits of circular configuration in cross section. The carrying capacity of these small conduits have been so small that during cold weather the cooling fluid easily becomes frozen and since the conduits cannot expand they easily burst as the cooling fluid freezes. This disadvantage has been overcome by substituting for such small circular conduits, conduits 7 which are of greater depth than width and which have their forward edges of less width than their rear edges. This construction is preferably obtained by making the conduits 7 of V-shaped configuration in cross section so that their side walls 8 diverge from their forward edges to their rear edges. The configuration of the conduits 7 is such that in case the cooling fluid passing therethrough freezes, the walls thereof will be forced away from each other and their cross sectional areas will be increased so as to allow for the expansion of the fluid during its freezing and to prevent bursting of the conduits.

The forwardmost edges of the conduits 7 are the narrowest so that the cooling air which passes through the radiator will not only strike and act upon the forward edges of the conduits but will strike and act upon the entire side walls 8 thereof.

The conduits 7 may be of the seamless type as indicated in Fig. 3, or they may be made in other ways such for instance as indicated in Fig. 6 where they are made from plates bent upon themselves intermediate of their edges and having their edges brought together and crimped as at 9.

The usual type of radiator employs in connection with the conduits a plurality of horizontal fin plates which are usually soldered to the framework of the radiator and to the conduits. The disadvantage of such a construction is that in case one of the conduits bursts, it cannot be repaired without first cutting away portions of some of the fin plates or else loosening all of the fin plates from the bursted conduit and entirely removing the latter. This disadvantage has been overcome by this invention by making the fin plates removable, and to accomplish this end the improved construction consists of an open frame 10 disposed flat against the front of the radiator and removably fastened thereto by means of bolts 11 preferably arranged in the four corners of the frame. The inner edges of the upper and lower members of the frame 10 have integrally formed therewith inwardly extending flanges 12 which extend the entire depth of the radiator. The inner edges of the side members of the frame 10 are provided with inwardly extending flanges 13, but these are comparatively narrow and only extend across a minor portion of the depth of the radiator. The flanges 12 are provided with V-shaped notches 14 in which the conduits 7 are received. The portions 15 between and adjacent to the notches 14 extend between and adjacent the conduits 7 and to these portions are secured the ends of vertical rods 16.

Supported or fastened upon the rods 16 are horizontal fin plates 17 provided with V-shaped notches 18 in which are received the conduits 7. The rods 16 extend through the portions 19 disposed between and adjacent the notches 18 and are soldered thereto. The forward edges of the plates 17 are preferably bent upon themselves so as to reinforce them at this point.

In assembling the fin plates to the frame, the plates are positioned between the flanges 12 and the rods 16 are inserted through the apertures 20 in the plates arranged for that purpose. The ends of the rods 16 are preferably, to some extent, pointed, so as to provide a ready insertion of them through the apertures 20. After the rods have been inserted through all of the apertures 20 and have their ends disposed in the proper position upon the flanges 12, they are soldered thereto, and the fin plates 17 are soldered to the rods.

In order to reinforce the radiator at the points where it is attached to the body of the automobile or the like, and to provide a novel means of attachment thereto, upper and lower plates 21 and 22 are preferably riveted or otherwise suitably secured to the side plates 6. The adjacent ends of the plates 21 and 22 are provided with outwardly extending abutting attaching lugs 23. These lugs 23 are apertured to receive suitable securing elements for fastening them to the body of the automobile or the like. The lower end of the plates 22 are bent around the bottom of the lower tank 4 so as to provide a means for additionally suporting the same.

It is obvious that the conduits 7 are of such construction that the cooling fluid passing therethrough will not readily freeze, but in case it does freeze, the conduits will not burst as they will expand to allow for the expansion of the fluid in the act of freezing. In addition to this the conduits are constructed so that they present comparatively large radiating surfaces to the action of the air passing through the radiator. By having the fin plates carried as a unit upon a frame and removable as a unit from the radiator, access to the conduits may be easily obtained in case it is desired to repair one or more of the conduits.

From the foregoing description, taken in connection with the accompanying drawings, the construction, use and advantages of the invention will be readily understood.

Various changes in form, proportion, and in the minor details of construction may be resorted to without departing from the spirit of the invention as defined in the claims.

I claim as my invention:

1. In a radiator for automobiles or the like, the combination of a unit including upper and lower tanks and vertical conduits disposed between the tanks and communicatively connecting them together; of a second unit mounted upon the first unit and detachable as a whole therefrom while the first unit is completely assembled, said second unit comprising a frame fitted upon the front of the first unit, a plurality of horizontal fin plates secured to and carried by said frame and having notches receiving said conduits, and means for detachably securing said frame to the front of the first unit.

2. A radiator for automobiles or the like comprising upper and lower tanks, vertical conduits disposed between said tanks and providing communication between said tanks, an open frame disposed flat against the front of the radiator and removably fastened thereto, flanges extending inwardly from the upper and lower members of said frame, vertical rods disposed between said flanges and having their ends secured thereto, and a plurality of horizontal fin plates fastened upon said rods and having portions disposed between said conduits, said plates being removable from the radiator with said frame.

3. A radiator for automobiles or the like comprising upper and lower tanks, vertical conduits disposed between said tanks and providing communication between said tanks, an open frame disposed flat against the front of the radiator and removably fastened thereto, flanges extending inwardly from the upper and lower members of said frame, a plurality of horizontal fin plates having notches for receiving said conduits and the portions adjacent and between said notches being disposed on the side of and between said conduits, and vertical rods extending between said flanges through the portions of said plates adjacent and between said notches, and having said portions of said plates secured thereto whereby the latter are removable form the radiator with said frame.

4. A radiator for automobiles or the like comprising upper and lower tanks, vertical conduits disposed between said tanks and providing communication between said tanks, said conduits being of considerably greater depth than width and of substantially V-shaped configuration in cross section with their narrowest edges forwardmost, and horizontal fin plates having V-shaped notches for receiving said conduits, the portions of said plates adjacent to and between said notches being disposed between said conduits, said plates being removable from said radiator.

5. The combination with a radiator for automobiles or the like, including upper and lower tanks, vertical conduits disposed between said tanks and providing communication between said tanks, and vertical side plates disposed between said tanks and having their ends secured thereto; of upper and lower reinforcing plates secured to said side plates adjacent said lower tank and having abutting outwardly extending attaching lugs at their adjacent ends, the lower reinforcing plates being bent under the bottom of said lower tank.

In testimony whereof I have hereunto set my hand.

HENRY N. JENSEN.